United States Patent
Donofrio et al.

(10) Patent No.: US 10,930,300 B2
(45) Date of Patent: Feb. 23, 2021

(54) AUTOMATED TRANSCRIPT GENERATION FROM MULTI-CHANNEL AUDIO

(71) Applicant: Veritext, LLC, Livingston, NJ (US)

(72) Inventors: Anthony Donofrio, Woodcliff Lake, NJ (US); David Joseph DaSilva, Haskell, NJ (US); James Andrew Maraska, Jr., Morristown, NJ (US); Jonathan Mordecai Kaplan, West Orange, NJ (US)

(73) Assignee: Veritext, LLC, Livingston, NJ (US)

( * ) Notice: Subject to any disclaimer, the term of this patent is extended or adjusted under 35 U.S.C. 154(b) by 295 days.

(21) Appl. No.: 16/179,087

(22) Filed: Nov. 2, 2018

(65) Prior Publication Data

US 2020/0143820 A1    May 7, 2020

(51) Int. Cl.
| | |
|---|---|
| *G10L 21/10* | (2013.01) |
| *G06F 3/16* | (2006.01) |
| *H04R 3/00* | (2006.01) |
| *G10L 21/0232* | (2013.01) |
| *H04R 1/40* | (2006.01) |
| *G10L 17/00* | (2013.01) |
| G10L 21/0208 | (2013.01) |

(52) U.S. Cl.
CPC ............. *G10L 21/10* (2013.01); *G06F 3/165* (2013.01); *G10L 17/00* (2013.01); *G10L 21/0232* (2013.01); *H04R 1/406* (2013.01); *H04R 3/005* (2013.01); *G10L 2021/02082* (2013.01)

(58) Field of Classification Search
None
See application file for complete search history.

(56) References Cited

U.S. PATENT DOCUMENTS

| | | | |
|---|---|---|---|
| 6,850,609 B1 * | 2/2005 | Schrage | H04M 3/42221 |
| | | | 379/158 |
| 7,231,351 B1 | 6/2007 | Griggs | |
| 8,131,545 B1 | 3/2012 | Moreno | |
| 8,738,374 B2 * | 5/2014 | Jaroker | G06Q 10/00 |
| | | | 704/235 |
| 9,697,871 B2 | 7/2017 | Hwang et al. | |
| 10,109,278 B2 | 10/2018 | Dzik et al. | |

(Continued)

OTHER PUBLICATIONS

Eriksson, Lars, "Algorithms for Automatic Segmentation of Speech," Lund University, Dept. Of Linguistics, *Working Papers* 35 (1989), 53-61.

(Continued)

*Primary Examiner* — Neeraj Sharma
(74) *Attorney, Agent, or Firm* — Knobbe, Martens, Olson & Bear, LLC

(57) ABSTRACT

Systems and methods are described for generating a transcript of a legal proceeding or other multi-speaker conversation or performance in real time or near-real time using multi-channel audio capture. Different speakers or participants in a conversation may each be assigned a separate microphone that is placed in proximity to the given speaker, where each audio channel includes audio captured by a different microphone. Filters may be applied to isolate each channel to include speech utterances of a different speaker, and these filtered channels of audio data may then be processed in parallel to generate speech-to-text results that are interleaved to form a generated transcript.

18 Claims, 7 Drawing Sheets

(56) References Cited

U.S. PATENT DOCUMENTS

| | | | |
|---|---|---|---|
| 10,573,297 B2* | 2/2020 | Iannone | G10L 15/10 |
| 2007/0071206 A1* | 3/2007 | Gainsboro | G10L 25/63 |
| | | | 379/168 |
| 2015/0039306 A1* | 2/2015 | Sidi | G10L 15/12 |
| | | | 704/235 |
| 2015/0066503 A1* | 3/2015 | Achituv | G10L 15/26 |
| | | | 704/235 |
| 2018/0061417 A1* | 3/2018 | Radadia | G10L 15/26 |
| 2018/0254040 A1* | 9/2018 | Droppo | G10L 17/18 |
| 2018/0350348 A1* | 12/2018 | Fukuda | G10L 21/003 |
| 2019/0139563 A1* | 5/2019 | Chen | G10L 21/0216 |

OTHER PUBLICATIONS

Heath, Janet, "Basics of bandpass filters," May 24, 2017, available at https://www.analogictips.com/basic-of-bandpass-filters/.

Kidd, Gerald Jr., et al., "Benefits of Acoustic Beamforming for Solving the Cocktail Party Problem," Trends in Hearing, 2015, vol. 19: 1-15.

Machupalli, Vidyasagar, "Who's speaking?: Speaker Diarization with Watson Speech-to-Text API," May 17, 2017, available at http://www.ibm.com/cloud/blog/whos-speaking-speaker-diarization-watson-speech-text-api?mhsrc=ibmsearch_a&mhg=who%27s%20speaking.

Mitianoudis, Nikolaos, "Audio Source Separation using Independent Component Analysis," Department of Electronic Engineering, Queen Mary, University of London, Apr. 2004.

* cited by examiner

DIGITAL REPORTER CONSOLE

FILE  AUDIO  VIEW  MISCELLANEOUS — 520

Case No.: 123xvc — 502
Date: 7/1/2018  12:02:39PM
Case Caption: Smith v. Jones
Location: Livingston, NJ
Client: John Q. Client — 504

Court Reporter : Rob Walter
Defense Attorney : Joe Gale
Deponent Attorney : Alex Lowe
Deponent : Amy Abbott — 506

Add Person — 508

00:00:01.55 — 512    Play — 514    Pause — 516

| | | |
|---|---|---|
| 00:00:00 | 1 | Rob Walter: Today is July first in the year two |
| 00:00:04 | 2 | thousand eighteen and we are here in living- |
| 00:00:09 | 3 | ston New Jersey for the deposition of Amy |
| 00:00:14 | 4 | Abbott in the matter of Smith versus Jones. I |
| 00:00:19 | 5 | am Rob Walter notary public. I will now ask |
| 00:00:26 | 6 | counsel to please identify themselves for the |
| 00:00:32 | 7 | record. |
| 00:00:37 | 8 | Joe Gale: I am Joe Gale I represent the |
| 00:00:42 | 9 | defendant in this matter. |
| 00:00:46 | 10 | Alex Lowe: For the record my name is Alex |
| 00:00:49 | 11 | Lowe representing the deponent we are going |
| 00:00:53 | 12 | to do the usual stipulations except we won't |
| 00:00:58 | 13 | wave reading and signing and at the outset I |
| 00:01:02 | 14 | would like to note that the deposition was |
| 00:01:06 | 15 | already rescheduled and we will not produce |
| 00:01:10 | 16 | miss Abbott for another day. |
| 00:01:16 | 17 | Joe Gale: Miss Abbot you are still under oath |
| 00:01:20 | 18 | do you understand that? |
| 00:01:24 | 19 | Amy Abbott: Yes I do |

— 510

NOTES:

| Timestamp: | Text: | |
|---|---|---|
| 20:31:23 | First note | Delete |
| 20:32:11 | Second note | Delete |
| 20:39:10 | Third note | Delete |

AUTOMATED TRANSCRIPT GENERATION FROM MULTI-CHANNEL AUDIO

BACKGROUND

There have been many advancements in the field of computerized speech-to-text processes over the past few decades. Many of these advancements focus on analyzing an audio recording of a single speaker, such as for the purpose of a user dictating words to a computer for the purpose of creating a document (e.g., authoring a letter, message, email, etc.) or commanding the computer to perform a function (e.g., a voice command to an in-car navigation system or a smart speaker). Speech-to-text functionality in this context provides benefits to the user by freeing the user to speak rather than needing to type. However, audio recordings in other environments present different technical challenges. For example, in instances where multi-speaker conversations or performances are recorded, it is desirable for a computer to identify each word spoken as well as who spoke each word. Improving the quality of speech-to-text generation in these multi-speaker environments, including improving the identification of the correct speaker for individual utterances, requires different technical solutions than those generally aimed at improving word recognition accuracy in a single-speaker environment.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 5 is an illustrative user interface generated for display by a digital reporter computing system that enables a user to enter speaker identification information and notes during a deposition, review a rough transcript of the deposition generated in real time, and play back recorded audio content at a selected point in the rough transcript.

DETAILED DESCRIPTION

Figure 1:
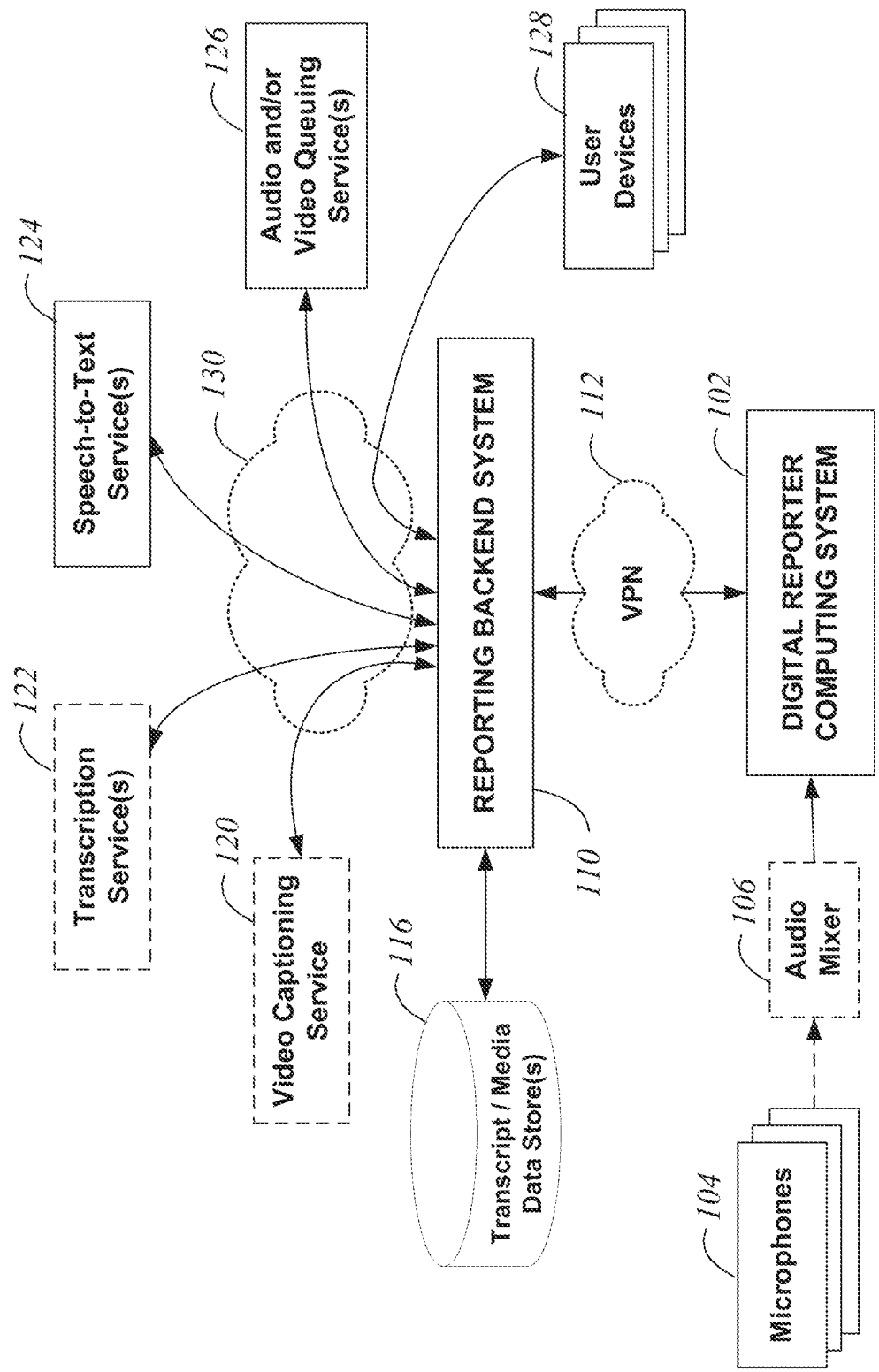
FIG. 1 represents an illustrative operating environment for generating a transcript of a multi-speaker audio recording and selectively playing back recorded media at a given point in the transcript, according to some embodiments.

Generally described, aspects of the present disclosure relate to generating transcripts from streaming audio data that includes speech utterances from multiple people (e.g., audio recorded from microphones in a room where a deposition for a legal proceeding is taking place, a debate takes place, or where a multi-actor scene is performed). The transcript may include, in an automated manner, proper attribution or identification of who spoke which words appearing in the transcript. The transcript may be generated in real time or near-real time as the speakers are speaking, and may be presented for display as text data on a display screen in the same room or other location of the audio recording. Aspects of the present disclosure may further enable a user of a computing system to select a portion of a displayed text transcription in order to request that the computing system audibly present (and/or visually present, in embodiments that include video recording) the recorded speech from the selected point in the transcript. Among other uses in other industries or fields, aspects of the present disclosure may provide benefits in connection with deposition support services, such as by enabling the generation of improved real-time "rough" transcripts of a deposition as the deposition is occurring, along with the ability to play back a desired portion of testimony (which may be referred to as "reading back" testimony in the legal proceeding context) in the original speaker's own voice at any point after it is spoken.

In some embodiments, multi-channel captured audio may be provided by a system described herein to one or more speech-to-text services or modules, where each individual audio channel's audio data may have been recorded or captured by a different microphone placed at a different location within a room. A single speaker's voice (e.g., words spoken by a single specific person) may then be isolated within the audio data of each channel, such that each channel includes isolated audio of words spoken by a different speaker. A different speech model (e.g., a model accounting for a certain accent, tonality, etc.) may be employed by the speech-to-text service or module used for each individual channel's audio (e.g., a model may be selected that is appropriate for the given speaker whose voice is isolated within the given channel). This channel-specific voice isolation and speech model selection may provide both computing efficiency and speech-to-text quality improvements over existing single-channel recording approaches.

Further computing efficiency and speed improvements may be seen by processing each individual channel's audio in parallel with audio of the other channels that was recorded simultaneously, as will be further described herein. Technical challenges and solutions related to these approaches are addressed herein, such as properly generating accurate multi-speaker transcripts when speech-to-text results associated with different channels are returned in an asynchronous manner during parallel processing (e.g., due to network latency issues, slower speech-to-text processing for one speaker with a difficult accent, etc.). While the term "speech-to-text" is often used herein, it will be appreciated that other terms in the art may refer to the same types of processes, including automatic speech recognition (ASR) and computer speech recognition. Thus, references to speech-to-text functionality or services described herein may be read as equivalently referring to ASR functionality or services Certain aspects of the present disclosure address problems that arise in audio processing where there is a desire to isolate audio originating from a single source (such as from a certain person) when a microphone or other input receives audio originating from multiple sources. For example, one version of this problem is sometimes referred to as the "cocktail party problem," of attempting to isolate one person's speech in a noisy multi-person environment that includes background conversations. One area of computational methods for separating multivariate signals into subcomponents in this manner is often referred to as independent component analysis (ICA), which may be considered an example of blind source separation techniques.

Some approaches to similar voice isolation problems have used a microphone array in a fixed configuration, along with beamforming techniques, to attempt to isolate speech from individual participants in a conference environment, for example. Advantages provided by aspects of the present disclosure over such microphone array approaches include advantages associated with having a dedicated microphone for each speaker (such as each speaking participant in a deposition, conversation, acting scene, or other environment of a given embodiment) placed on or very near the given speaker. This provides significant computational efficiencies and speech diarization quality improvements relative to alternative microphone array approaches.

The phrase "digital reporting" is sometimes used in the legal industry to refer to processes by which witness testimony is captured via digital audio devices and subsequently transcribed to create a final transcript of the proceeding (which is often performed by a human transcriptionist in existing systems). Digital reporting in the legal industry is sometimes alternatively referred to as "audio reporting" or "electronic reporting." While "digital reporting" or "digital reporter" is used herein in examples and system names, such as a digital reporter computing system, this is not intended to limit aspects of the present disclosure to implementation or use within the legal industry exclusively. For example, while functionality provided by a digital reporter computing system described herein offers significant benefits to a court reporter, transcriptionist and/or attorneys in a digital reporting environment (in association with a deposition or other legal proceeding), uses outside of the legal industry are also contemplated and described herein.

Within the digital reporting field within the legal industry, commonly used existing systems are missing many capabilities that are provided by aspects of the present disclosure. Such features provided by aspects of the present disclosure include generating highly accurate "real-time" streaming text transcripts of a proceeding, generating highly accurate "rough" transcriptions available shortly after the proceeding (e.g., within one hour of the end of a seven hour proceeding), and making digital video available shortly after the proceeding that is compliant with common practice and various codes (e.g., civil codes of practice for various jurisdictions). Features described herein may also speed up the process of any human-performed quality control or review between the automated generation of a "rough" transcript and subsequent conversion to a "final" transcript, such as by visually highlighting words having automated speech-to-text confidence levels below a given threshold. As further discussed herein, the disclosed systems and methods described herein may generate a formatted, proofable, rough version of a transcript without any manual effort, which can be proofed and delivered as a final certified transcript significantly faster and with significantly less manual effort than existing systems. The systems and methods described herein may further generate a text-synchronized audio-video file in a fraction of the time it would take to produce a separately shot video and transcribed audio proceeding according to existing methods.

FIG. 1 represents an illustrative operating environment for generating a transcript from a multi-speaker audio recording or streaming source, and selectively playing back recorded media at a given point in the transcript, according to some embodiments. The illustrative environment of FIG. 1 includes a number of microphones 104, which may be located in different positions within a room or other area in which speech to be recorded or captured will be uttered or spoken (such as in the example environment that will be discussed below with respect to FIG. 2). Audio data recorded or captured by the microphones may be provided via wired or wireless connections to an audio mixer 106. In some embodiments, audio mixer 106 may be professional or commercial grade audio mixing hardware that supports simultaneous recording of multiple audio channels (such as at least four channels, in one embodiment, extendible to additional channels without departing from the methods described herein) via separate inputs, and which has relatively low latencies and high throughputs relative to traditional consumer grade computer audio hardware. However, many of the advantages described in the present disclosure may be achieved without the quality of individual channels of audio necessarily being greater than standard consumer grade microphone and audio equipment, such as that typically used for dictation recordings.

The audio mixer 106 may be in wired or wireless communication with a digital reporter computing system 102, or may be included as a component within the digital reporter computing system 102, depending on the embodiment. The digital reporter computing system, which will be described in more detail below with respect to FIG. 6, may in some embodiments generally provide both (a) audio processing functionality for transcript generation and (b) media playback functionality based on user interaction with a transcript presentation user interface, among other features that will be described herein.

In some embodiments, an administrative user may interact with user interfaces generated by the digital reporter computing system 102 in order to provide input to the system for use by the system in generating real-time transcripts. For example, in one embodiment, a court reporter or stenographer who is present at a deposition for a legal proceeding may use or operate the digital reporter computing system 102 in order to provide the system with information regarding the parties involved in the deposition. Such a user may additionally provide the system with information regarding each speaker in the deposition (e.g., attorneys, a witness, etc.), which may be used by the digital reporter computing system 102 to select appropriate speech models. The digital reporter computing system 102 may alternatively be used in environments other than a legal proceeding. For example, if the digital reporter computing system 102 is used to create closed captioning of a live television show, news report or live performance, a user of the digital reporter computing system 102 may be an employee of a closed captioning services company, a television network, production company, or similar entity. In other embodiments, aspects of the present disclosure may provide closed captioning of words spoken in an educational setting for a listener or participant who is deaf or hearing impaired.

As further illustrated in FIG. 1, the digital reporter computing system 102 may be in communication with a reporting backend system 110 via a virtual private network (VPN) 112. As is known in the art, the VPN 112 may effectively extend a private network associated with a reporting services provider (such as a legal services company that operates the reporting backend system 110 and makes the digital reporter computing system 102 available for various legal proceedings, or a hearing-impaired education content provider, a sports broadcasting network, and/or other provider) across a public network, such as the Internet. The VPN 112 may thus enable the reporting backend system 110 and digital reporter computing system 102 to send and receive data between each other across one or more shared or public networks as if these systems were directly connected via a private network (thereby benefiting from improved security relative to standard public network communications). Use of a VPN in this manner may be particularly beneficial when the digital reporter computing system 102 is used for transcribing a confidential event, such as a deposition that will not be made available to the public or a confidential arbitration proceeding. In embodiments that lack such an expectation of confidentiality or privacy (such as closed captioning transcription for a public television broadcast), communications may occur via the Internet or other public network without the additional security of a VPN.

In the embodiment illustrated in FIG. 1, the reporting backend system 110 may be a server or multiple servers that provide reporting backend services associated with features provided via the digital reporter computing system 102 and/or associated with features accessible via user devices 128. For example, network-accessible services provided by or enabled by the reporting backend system may include aspects of the speech-to-text conversion and transcript generation processes, storage and management of generated transcripts and associated media files (e.g., recorded audio and/or video), and various deposition support services (e.g., scheduling depositions or other court reporter services, and/or storing and accessing exhibits and other files associated with depositions or other legal proceedings). The reporting backend system 110 may store generated transcripts and associated audio and/or video media in transcript/media data store 116. The transcripts and media stored in data store 116 may be encrypted and may each be grouped by matter or proceeding. Each matter may be associated with one or more authorized user accounts (e.g., an account of an attorney, law firm or other client that uses the digital reporting services provided via the digital reporter computing system 102), such that the files for a given case or matter are only accessible from user devices 128 that have proper account credentials.

In the illustrated embodiment of FIG. 1, the reporting backend system 110 may request various services from external or third-party systems, such as video capturing functionality provided via a video capturing service 120, transcription services from one or more transcription services 122, speech-to-text functionality from one or more speech-to-text services 124, and/or audio synchronization or queuing functionality from audio and/or video queuing service 126. The communications between reporting backend system 110 and services 120, 122, 124 and 126 may employ a secure cryptographic protocol (such as Transport Layer Security or Secure Sockets Layer) over network 130, such as the Internet. However, in other embodiments, the reporting backend system 110 may locally implement or provide each of these functionalities or services that are shown as external services 120, 122, 124 and/or 126 in FIG. 1. Accordingly, in such embodiments, the reporting backend system 110 and digital reporter computing system 102 may in combination provide all functionality described herein as being provided by any of services 120, 122, 124 and/or 126 without reliance on any external or third-party systems or services. In some embodiments, additional external and/or third-party systems or services not illustrated in FIG. 1 may implement features related to those described herein, such as a video transcoding/or video synchronization service.

In further embodiments, the digital reporter computing system 102 may be capable of generating real-time transcripts and playing back associated audio or video data without accessing a reporting backend system or any other external systems or services (e.g., without necessarily sending or receiving data to any remotely located system, server or service over a network). In still further embodiments, individual user devices 128 may be utilized by participants in a proceeding to record audio data (e.g., by a microphone associated with each user device) and provide the audio data in real time to the reporting backend system 110 for transcript generation without a dedicated digital reporter computing system and without a court reporter or similar administrative individual being present in the proceeding.

Figure 2:
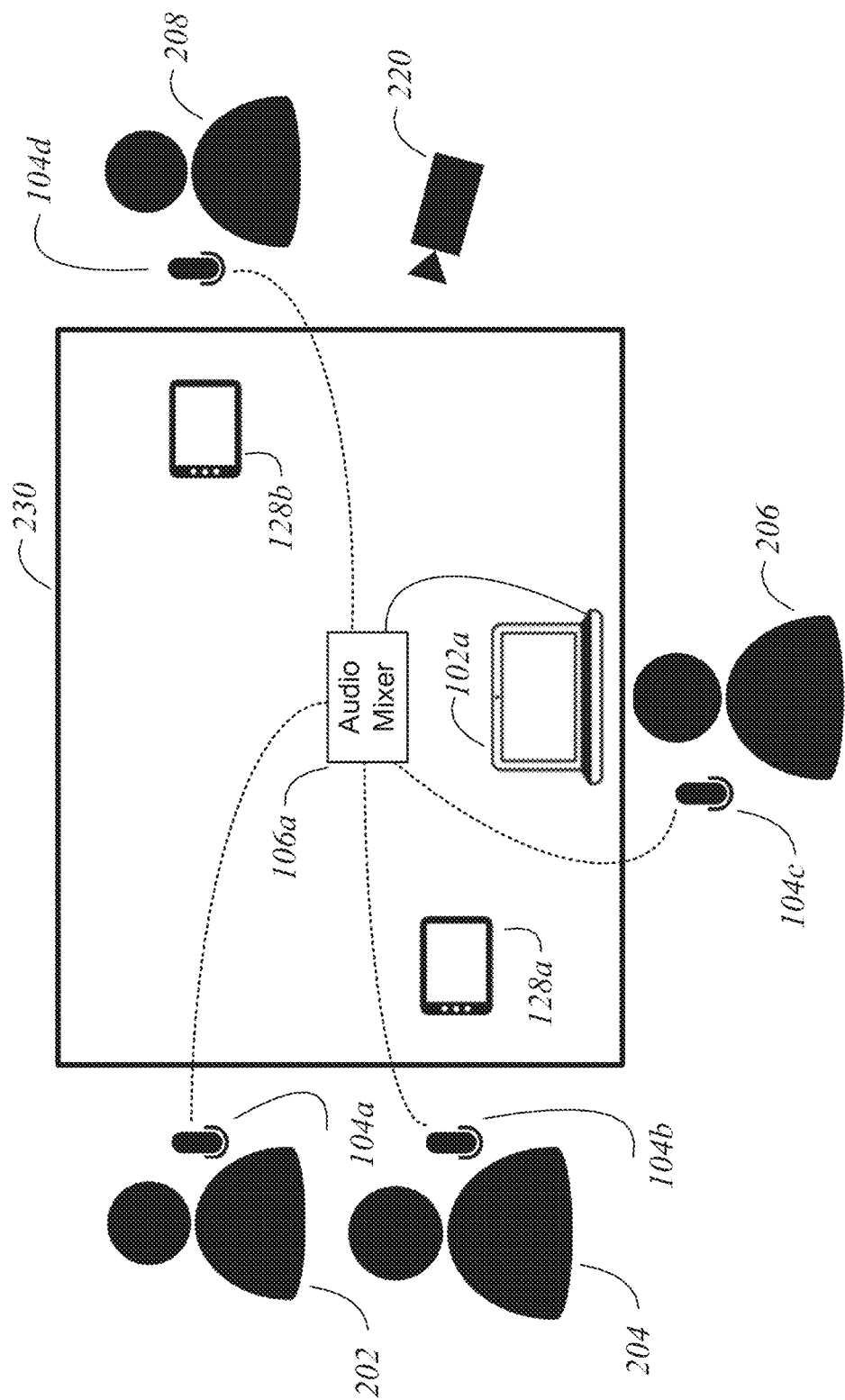
FIG. 2 represents an example configuration of participants and devices at a location, such as a room, in which the participants' spoken words are recorded for transcription.

FIG. 2 represents an example configuration of participants and devices at a location, such as a room, in which the participants' spoken words are recorded for transcription. The recording environment depicted in FIG. 2 is one example of an environment suitable for recording audio and optionally video data for the generation of real-time transcription according to aspects of the present disclosure. It will be appreciated that a large number of variations may be made to the recording environment, including the number and positioning of speaking participants and the positioning of microphones relative to individual participants.

As illustrated, FIG. 2 may depict a conference room in which tablet computing devices 128a and 128b, as well as an audio mixer 106a and laptop computer 102a are placed on a table 230. The tablet computing devices 128a and 128b may be utilized by attorneys 204 and 208, respectively, during a deposition in a legal proceeding. For example, attorney 204 may be defending the deposition of a witness 202, and attorney 208 may be taking the deposition of the witness 202. Tablet computing devices 128a and 128b may enable attorneys 204 and 208 to view and interact with a live "rough" transcript of the deposition as the deposition proceeds. The transcript content may be received in real time via a network connection to reporting backend system 110 or via a local wired or wireless connection to laptop device 102a or other local device. The laptop device 102a may be one example of a digital reporter computing system as described herein, and may be operated by a court reporter 206, in one embodiment. In other embodiments, user devices 128a and 128b may be computing devices other than tablet computing devices, such as laptop computers, smartphones or other mobile devices, display monitors in communication with desktop computers, or other devices.

As illustrated in FIG. 2, the various individuals (witness 202, attorney 204, court reporter 206 and attorney 208) present during the deposition may each have an associated microphone (microphones 104a, 104b, 104c and 104d). Depending on the embodiment, the microphones may each be placed on the respective person (e.g., a lapel microphone attached to clothing worn by the individual) or near the respective person (e.g., placed on the table 230 in front of or otherwise close to the respective individual). The microphones 104a-104d may be in wired or wireless communication with the audio mixer 106a, which in turn may be in wired or wireless communication with the digital reporter computing system 102a in order to process the captured audio from each microphone (where the audio mixer 106a may capture each microphone's audio as a separate channel). In other embodiments, one or more participant's microphone (such as the court reporter 206) may be a built-in microphone within a computing device utilized by the given participant (e.g., the computing device 102a), such that not every participant has a dedicated standalone microphone. In embodiments in which the proceeding is video recorded, a video camera 220 may also be present. In some embodiments, the video camera may stream video and/or audio data directly to the digital reporter computing system 102 in real time as it is captured, or may send such content via audio mixer 106a. The video camera 220 may be provided, in some embodiments, as part of a kit or bundle with audio equipment (such as the audio mixer 106a and microphones 104a-104d), and/or may be set up at the given deposition location or other location by someone on behalf on an entity that manages the reporting backend system. The video camera 220 may be configured to capture video in time synchronization with audio captured by the microphones 104a-104d, such as by the video camera and microphone timestamping recorded media using the same shared or universal clock. Given that captured video may be timestamped using the same clock as the captured audio data, a synchronized transcript created based on the audio, as described herein, may be presented in synchronization with presentation of corresponding recorded video data.

While FIG. 2 and other examples described herein often refer to a deposition environment, aspects of the present disclosure provide many benefits outside of the legal proceeding context. For example, as mentioned above, real-time transcription features described herein may be used to create closed captioning of a live television show, news report or live performance. As another example, real time transcription features described herein may generate captioning of multi-speaker discussions in an educational or employment setting, such as to comply with the Individuals with Disabilities Education Act (IDEA), the Americans with Disabilities Act (ADA), or other applicable laws or rules.

Figure 3A:
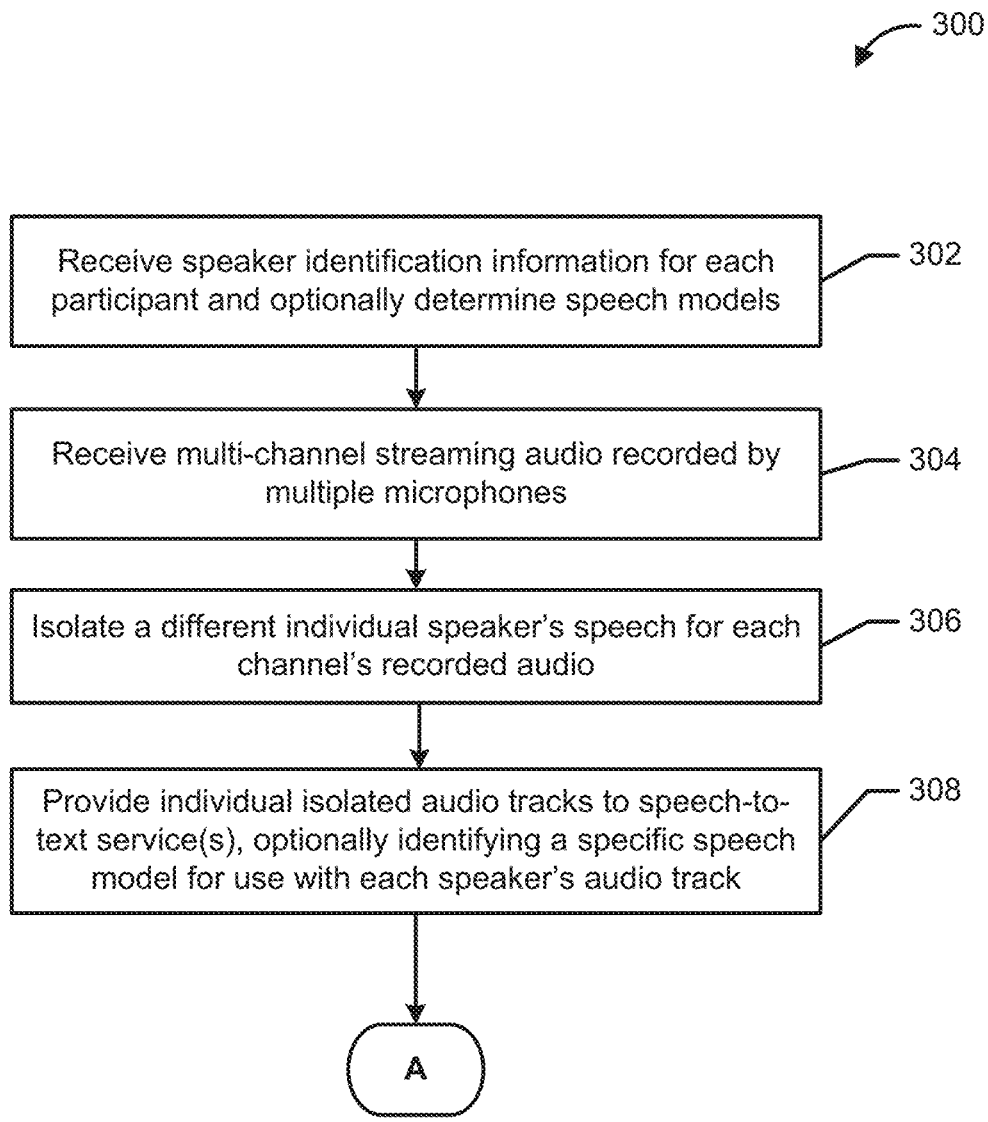
FIGS. 3A and 3B are illustrative flow diagrams of a method for generating a real-time transcript of a multi-speaker conversation from a stream of multi-channel captured audio, according to some embodiments.
Figure 3B:
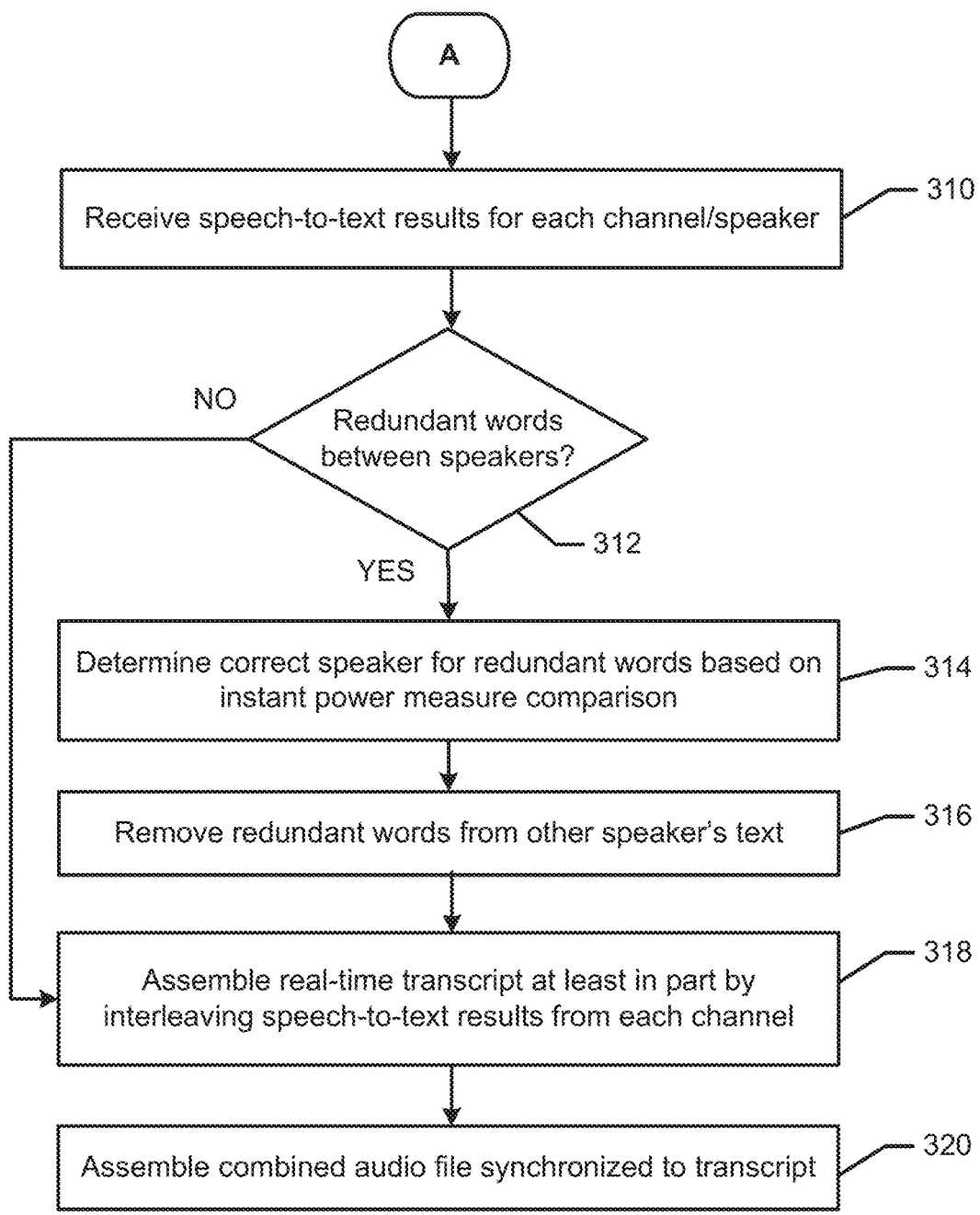

FIGS. 3A and 3B are illustrative flow diagrams of a method 300 for generating a real-time transcript of a multi-speaker conversation from a stream of multi-channel captured audio, according to some embodiments. Illustrative method 300 may be implemented by the digital reporter computing system 102, including via a hardware processor or processing unit of the digital reporter computing system performing operations as a result of executing computer-executable instructions provided by a transcript generation component or module of the digital reporter computing system (described further below with respect to FIG. 6).

The illustrative method 300 begins at block 302, where the digital reporter computing system receives speaker identification information for each participant and optionally determines a speech model to use for speech-to-text processing of individual speakers. A speaker may refer to a human participant in a conversation or performance, or who is otherwise expected to speak during a time period in which the digital reporter computing system will be processing audio for transcription. For example, with reference to the example deposition environment of FIG. 2 discussed above, the speakers may include two attorneys, a witness and a court reporter. In some embodiments, an operator of the digital reporter computing system (such as a court reporter) may input speaker information via a user interface generated by the digital reporter computing system. In other embodiments, individual participants may enter their own information via separate user interfaces presented on separate computing devices operated by each participant (e.g., personal tablet or mobile computing devices).

The speaker identification information for each participant received at block 302 may include which microphone or audio channel the individual participant will be assigned to, the name of the participant, and the title and/or role of the participant (e.g., defending attorney in the deposition). In some embodiments, the speaker information may additionally include personal or vocal characteristic information that may be used by the digital reporter computing system to determine an appropriate speech model to use for that speaker. For example, a user may select, for each speaker, various options that allow the user to indicate to the digital reporter computing system any accent, speech pattern, tonality, regional dialect and/or other personal or vocal characteristic that may be useful in selection of a speech model to be used in ASR for the given speaker. Additionally, the speaker identification information may indicate special dictionaries or vocabulary that should be used in the speech-to-text process for a given speaker (e.g., designating that a speaker is a medical expert or an engineer likely to use terms specific to the indicated field). In some embodiments, specific dictionaries may be utilized with respect to a specific legal case's subject matter (e.g., a patent litigation case, bankruptcy case, etc.) and/or parties (e.g. a custom dictionary with certain individual names, company names, names of products, acronyms, etc.), with respect to a specific sporting event or other event, or a particular educational course, as appropriate.

As an example, received vocal characteristic information for one speaker in one example may be "American English, Northeast region, Male, medium tone." In some embodiments, a user interface presented by the digital reporter computing system or other device may enable a user to separately select a value from various drop down menus or other selectable items (e.g, one field or menu may enable selection from various tonality options, while another field or menu may enable selection from various regional accents, etc.). In other embodiments, various available speech models may be summarized for the user (e.g., identified by descriptions such as "American English, Southern accent, Female"), such that the user may select the most appropriate model based on initial observation of each speaker or explicit input from each speaker. In further embodiments, a custom or personalized speech model may be available for certain speakers (such as a frequent client or user of the digital reporter computing system or associated speech-to-text service), such that a speech model that has been previously specifically trained with respect to a specific individual may be selected for a certain speaker.

At block 304, the digital reporter computing system may receive multi-channel streaming audio captured by multiple microphones. For example, with reference to FIG. 2, the digital reporter computing system 102a may receive audio simultaneously captured on four different channels (where each channel includes audio captured by a different one of four separate microphones 104a-104d) via an audio mixer 106a. Once the multi-channel audio capture begins at block 304, the remaining blocks of illustrative method 300 may proceed with respect to audio thus far captured while further audio capture continues, such that blocks subsequent to block 302 are repeatedly performed with respective to successive portions of streaming audio in real time or near-real time as the successive portions are captured.

At block 306, the digital reporter computing system may isolate a different individual speaker's speech for each channel's recorded or captured audio. As mentioned above, a number of approaches to independent component analysis (ICA) or blind source separation techniques may generally be used to isolate and/or enhance sounds originating from a certain individual. In some embodiments, the digital reporter computing system may employ techniques specifically tailored to the case in which (a) there are N microphones and N speakers, and where (b) it is known which of the N microphones each participant is physically closest to when speaking. For example, with reference to the environment of FIG. 2, a user may indicate to the digital reporter computing system which microphone of microphones 104a-104d is physically closest to (e.g., worn by as a lapel microphone)

each of speakers 202, 204 206 and 208. In some embodiments, the digital reporter computing system may use a combination of filtering, beamforming, adaptive weighting and echo cancellation with respect to each channel to isolate audio from a different person on each channel, such as the process that will be further described below with respect to FIG. 4.

At block 308, the digital reporter computing system may provide individual speaker's audio tracks (after applying filtering and isolation above) to speech-to-text service(s), optionally identifying a specific speech model for use with each speaker's audio track. For example, if one person's speech is on a first audio track or channel, and a second person's speech is on a second audio track or channel, these two channels' audio content may have speech-to-text or ASR applied in parallel by either (a) the digital reporter computing system locally or (b) an external speech-to-text service 124 accessible via the reporting backend system 110, depending on the embodiment. There are a variety of commercially available speech-to-text services or applications that may be used, and either the same or different services could be used for each channel's audio. Furthermore, different speech models tailored to the vocal characteristics of a given speaker whose voice is isolated on a given channel may be indicated by the digital reporter computing system to the speech-to-text model or service when providing audio for transcription, as discussed above.

FIG. 3B illustrates additional blocks of method 300, description of which started above with respect to FIG. 3A. At block 310 of FIG. 3B (which may be performed following block 308 of FIG. 3A), the digital reporter computing system 102 may receive speech-to-text results for each channel/speaker. As referenced above, the speech-to-text results may be received or become available as a result of parallel processing of each channel's audio data by one or more speech-to-text services, components or modules.

The order that each channel's speech-to-text results are returned to the digital reporter computing system may not directly match the real-time order that the audio was recorded or captured by the microphone. For example, speech-to-text processing for one channel may be completed seconds ahead of speech-to-text processing of audio from another channel having matching recording timestamps. This may be caused, for example, due to network latency issues, slower speech-to-text processing for one speaker with a difficult accent (e.g., may be caused in part by the speech model used for the given speaker), and/or a difference in the specific speech-to-text services employed. Accordingly, text results returned from the speech-to-text processing of individual channels may be placed in queues (along with corresponding audio, in some embodiments) prior to obtaining sufficient results across channels that a next portion of combined multi-speaker transcript can be generated (discussed below).

For example, multiple questions of transcribed text corresponding to words spoken by one speaker (e.g., "Do you recognize this document? What is it?") may be received from the speech-to-text services prior to receipt of a second channel's text containing an answer to the first question (e.g., "Yes, I recognize it"). The digital reporter computing system may store timestamp information associating the text results returned for each channel (such as by word, syllable, line or other unit) with times from a clock in common among all channels' audio to facilitate the digital reporter computing system later interleaving or combining the results in the original sequence received, as will be further discussed below.

At decisional block 312, the digital reporter computing system may determine whether any redundant words appear in text attributed to two different speakers at the same point in the conversation. For example, one channel's text results may include "Do you recognize this document? Yes what is it," and another channel may also include the word "yes" (such as "Yes, I recognize it") at the same timestamp position as the "yes" in the first channel's text results. While the speaker isolation applied at block 306 would ideally minimize or eliminate such instances, they may occur occasionally. Whenever such a word redundancy between two or more channels is detected, the method may proceed to block 314. Otherwise (e.g., for time positions at which no redundant text appears among speech-to-text results of different channels' audio), the method proceeds to block 318.

At block 314, which only occurs with respect portions of the captured audio in which a common word appears in two or more channels' text results at matching timestamps, the digital reporter computing system may determine the correct speaker for the one or more redundant words (identified above at block 312) based on an instant power measure comparison at the given point in each audio stream or recording. The instant power measure may represent, for each channel having a redundant word or words, the relative volume of audio input captured by the respective microphone at that instant (the instant when the speech utterance that was interpreted by the speech-to-text processing to be the common word was captured by each microphone).

The digital reporter computing system may then select the channel having the highest/loudest instant power measure at the time of the utterance as the correct channel/speaker for the redundant word(s). This approach is based on the assumption that each speaker's microphone has been set up to be closer to him than to any other speaker, and provides improvements relative to alternative approaches that rely on statically arranged microphone arrays. The digital reporter computing system may then remove the redundant word(s) from the other speaker's text results (e.g., from the text results for the channel having a lower instant power measure) at block 316.

At block 318, the digital reporter computing system may assemble a real-time transcript at least in part by interleaving speech-to-text results from each channel. In some embodiments, the digital reporter computing system may perform block 318 based at least in part on communications with the reporting backend system 110, which may in turn be in communications with a transcription service 122 and/or queuing service 126 for performing aspects of the transcript assembly. Interleaving the speech-to-text results from each channel may include assembling all text results generated from each of the audio channels into a single transcript, with the ordering of text determined according to audio timestamp information for each word or discrete spoken section (e.g., utterance, syllable, sentence, line or other unit). Aspects of FIG. 4 (discussed below) related to speaker diarization techniques may also be employed in assembling the transcript.

Generating the transcript may additionally include adding an identification of the speaker each time that a change in speaker occurs in the transcript. For example, if a first audio channel included words spoken by Joe Smith and a second audio channel included words spoken by Bob Jones (e.g., a user of the digital reporter computing system has indicated that a first microphone on Channel 1 is worn by Joe Smith and a second microphone on Channel 2 is worn by Bob Jones) the transcript may be generated such that any time text generated from the first channel appears it is prefaced with the designation "Joe Smith:". Similarly, in this example according to one embodiment, any time text generated from the second channel appears it may be prefaced with the designation "Bob Jones:".

In some embodiments, transcript text may be automatically formatted according to certain predetermined transcript formats for efficient transcription and faster turnaround time. The transcript format used for a given proceeding may be based on the proceeding type (e.g., civil depositions, arbitration hearings, examinations under oath, etc., which may each have a different assigned format, as well as sub-formats of those types based on jurisdiction). Text formatting and document construction may employ appropriate templates for each proceeding type and/or jurisdiction.

At block 320, the digital reporter computing system may optionally assemble a combined audio file synchronized to the transcript that was generated at block 318. For example, in some embodiments, instead of or in addition to storing the original multi-channel audio tracks, the digital reporter computing system and/or the reporting backend system may generate and store an enhanced audio file that interleaves the speaker-isolated tracks according to the track assigned to the active speaker at each instant. For example, the specific audio channel that had its speech-to-text results used in the generated transcript at a given timestamp position may be the audio data placed at that timestamp position within a generated final audio file. In some embodiments, the generation of the combined audio file at block 320 may be based in part on audio queuing services 126, and the resulting audio file may be streamed in real-time back to the digital reporter computing system from the reporting backend system 110 and/or be stored for future retrieval in transcript/media data store 116. In some embodiments, final audio, transcript and/or video files may be certified as valid via a digital marking method. Such validation marking may be desirable where concerns of tampering with the audio record could be raised.

Figure 4:
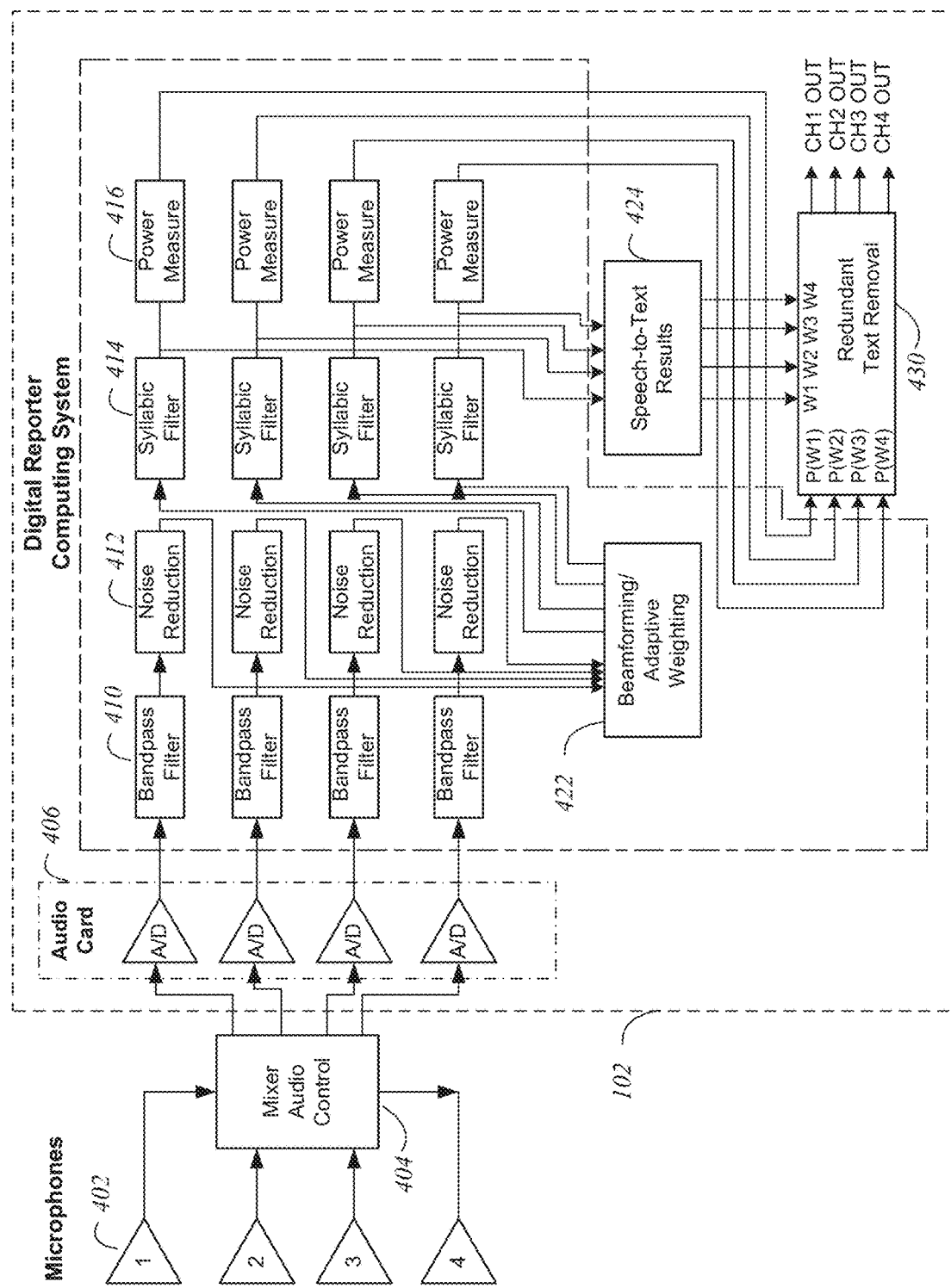
FIG. 4 illustrates an example flow of data for performing speaker diarization with respect to multi-channel audio, as performed by a digital reporter computing system in one embodiment.

FIG. 4 illustrates an example flow of data for performing speaker diarization with respect to multi-channel audio, as performed by digital reporter computing system 102 in one embodiment. The speaker diarization approach illustrated in FIG. 4 is one example of methods that may be used in some embodiments to improve the quality of automated transcripts generated according to aspects of the present disclosure. One goal of performing speaker diarization with respect to FIG. 4 is to isolate, to the fullest extent possible, the sound from each speaker on his or her respective microphone or audio channel.

As previously discussed, each speaker may be provided his or her own microphone (e.g., a lapel microphone), such as microphone 402 that may be assigned to a first speaker. As illustrated, each microphone's captured audio signal is fed through a mixer audio control 404, and is in turn fed into audio card 406 of the digital reporter computing system 102. The audio card 406 may include an input for each microphone as a separate audio channel via corresponding analog-to-digital converters (A/D). Each channel's audio data may then pass through a respective bandpass filter 410 and noise reduction filter 412. These filters may clean and clarify the audio signals, such as by being configured to filter out incoming audio signals that do not correspond to a human voice and/or to filter out background voices spoken by people other than the active speaker on a specific channel. Each filtered audio channel is then processed by one or more beamforming and/or adaptive weighting algorithms or techniques (which may be considered adaptive beamforming) and/or echo cancellation, which may be designed to allow further separation of audio on each channel to the person speaking on that channel at any particular instant.

Each processed audio channel's data is then passed to an optional syllabic filter 414 (which may determine syllabic boundaries in each signal using known techniques), then to a speech-to-text service or application (discussed above) to obtain speech-to-text results 424. As the speech-to-text results 424 are received, the digital reporter computing system may determine whether any words appear on more than one channel at the same time, as discussed above with respect to FIG. 3B. If any redundant words are present between text results for two or more channels, the digital reporter computing system may then acquire an instant power measure 416 (e.g., an indication of the relative volume or signal intensity of each audio channel at that instant) for each of the channels with redundant text. As discussed previously, in some embodiments, the digital reporter computing system may then select the loudest channels at that instant (the highest instant power measure) as the channel corresponding to the primary speaker of the redundant word, and may remove the redundant word from the text of any other channels at 430. In some embodiments, the digital reporter computing system may additionally consider manually entered speaker change notes (such as those entered via hot keys or user interface selections by a court reporter or other user at the time of a speaker change) in addition to the power measure information. For example, a confidence level that that the digital reporter computing system determines regarding who spoke specific words may take into account not only a comparison of relative power measures at that instant, but also consider whether a user designated a certain speaker as being the active speaker at that instant.

FIG. 5 is an illustrative user interface generated for display by a digital reporter computing system that enables a user to enter speaker identification information and notes during a deposition, review a rough transcript of the deposition generated in real time, and play back recorded audio content at a selected point in the rough transcript. In some embodiments, a user may use a cursor position or touch screen gesture to indicate any desired starting position in the transcript text 510 at which the user would like to hear corresponding recorded audio, and may then play or pause such audio using selectable options 514 and 516, respectively. For example, the playback position 512 may automatically update as the user select a new position within the transcript 510 (e.g., by selecting a word, timestamp or line number from which point the user would like to begin listening to the corresponding audio recording).

During display of the transcript 510, the exact word position of either current live speech-to-text results (during a live recording session) or a current playback position (during playback of a previously recorded audio portion) may be visually indicated in the user interface by a cursor or other graphical indicator (not illustrated). The transcript text 510 may be automatically scrolled to keep text representing the audio at the current playback position of the audio (during playback) or the most recently generated text (during live recording) in view. The user (such as a court reporter or other digital reporter operator) may use a cursor or touchscreen gesture to select individual words to edit (e.g., to fix an error in speech-to-text processing), and such edits may be promulgated to matching words throughout the transcript, in some embodiments.

The case information section 502 includes information associated with the court case for which the deposition is being taken, along with location of the deposition and client of the digital reporting service. Speaker mapping section 504 enables the user to identify the participant or speaker assigned to each channel (e.g., "Speaker 0" may represent the first channel, "Speaker 1" the second channel, etc.), both by name and role. Additional participants may be added by selecting "Add Person" option 506. The notes section 508 enables the user (such as a court reporter) to add notes regarding occurrences at specific points in the proceeding, with an associated timestamp automatically added reflecting the instant in the transcript (during recording or playback) when the user began to type the note. For example, notes may indicate when exhibits were entered, note the spelling or meaning of proper nouns or acronyms, etc. The user may select a previously entered note in order to cause the system to jump to the instant in the text transcript and audio playback associated with the note's timestamp. In some embodiments other than that illustrated in FIG. 5, the notes section may include an indication of a speaker identifier (e.g., "Speaker 0," "Speaker 1," or other identification information for specific individual speakers) along with a timestamp that a court reporter or other user indicated that speaker began speaking. For example, the court reporter or other user may press a designated hot key or select a designated user interface element for any particular speaker to indicate a change in active speaker (e.g., may press a hot key associated with Speaker 2 to indicate that Speaker 2 just began speaking, when another speaker had been speaking immediately prior to that time). In some embodiments, this timestamp information may be used to provide increased confidence in the system's determination of who the active speaker is at a given point in combination with other automated methods described herein that do not rely on human input, and/or may be used to aid in subsequent human proofing of automatically generated transcripts.

Various options may be available to a user via the user's selection of pull-down menu options 520. For example, the "File" menu item may include options (not illustrated) that enable the user to sign on to a repository service offered by the operator of the reporting backend system in order to retrieve various information associated with the given matter that the proceeding relates to, and/or to initiate secure, encrypted communication over the VPN 112 for access to backend systems or services. The "File" menu options may further include options to open or save the current recording session, and/or to create a data package of the various generated data for upload to the reporting backend system 110 (e.g., for storage in transcript/media data store 116).

The "Audio" menu item may include options (not illustrated) for enabling or disabling native speaker recognition features (such as those offered by some third-party speech-to-text services), configuring audio stream input/output (ASIO) associated with the device's sounds card, configuring microphone inputs, beginning audio recording, and/or pausing/resuming audio recording. The "View" menu item may include options (not illustrated) to toggle word confidence shading display associated with an automated speech-to-text process. For example, toggling word confidence "on" may add colored shading to a portion of the individual words displayed in transcript portion 510 to indicate to the user which words may have lower confidence levels according to the speech-to-text methods employed to generate the text. Such confidence shading may be helpful for the user to notice words that he or she may wish to manually fix or edit, or otherwise for subsequent human proofing purposes.

Figure 6:
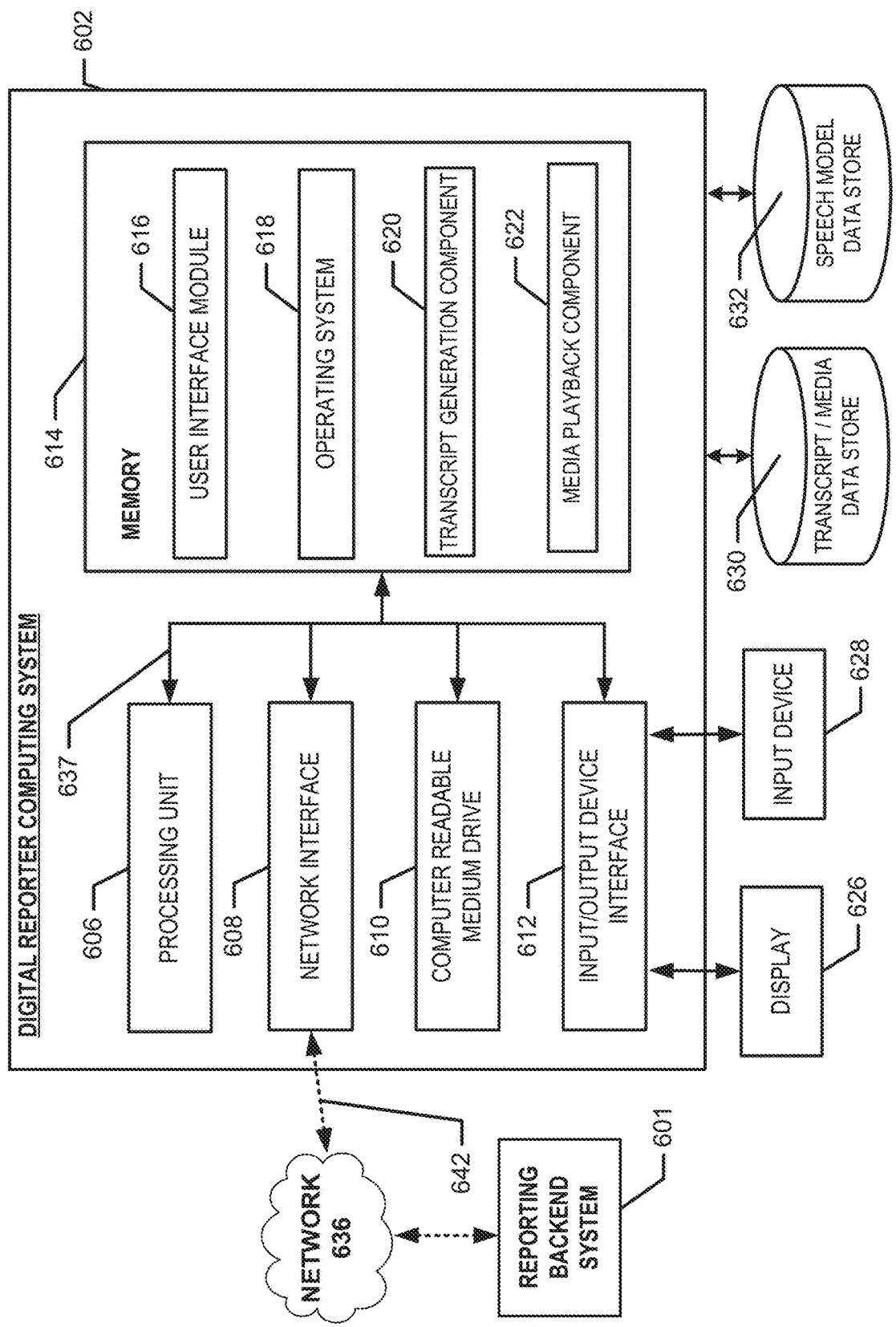
FIG. 6 is a system block diagram of a computing environment suitable for use in various embodiments of the present disclosure.

FIG. 6 illustrates a general architecture of a computing environment that includes a digital reporter computing system 602, according to some embodiments. The general architecture of the digital reporter computing system 602 may include an arrangement of computer hardware and software components used to implement aspects of the present disclosure. The digital reporter computing system 602 may include many more (or fewer) elements than those shown in FIG. 6. It is not necessary, however, that all of these generally conventional elements be shown in order to provide an enabling disclosure.

As illustrated, the digital reporter computing system 602 includes a processing unit 606, a network interface 608, a computer readable medium drive 610, an input/output device interface 612, a display 626, and an input device 628, all of which may communicate with one another by way of a communication bus 637. The processing unit 606 may communicate to and from memory 614 and may provide output information for the display 626 via the input/output device interface 612. The input/output device interface 612 may also accept input from the input device 628, such as a keyboard, mouse, digital pen, microphone, touch screen, gesture recognition system, voice recognition system, or other input device known in the art.

The memory 614 may contain computer program instructions (grouped as modules or components in some embodiments) that the processing unit 606 may execute in order to implement one or more embodiments described herein. The memory 614 may generally include RAM, ROM and/or other persistent, auxiliary or non-transitory computer-readable media. The memory 614 may store an operating system 618 that provides computer program instructions for use by the processing unit 606 in the general administration and operation of the digital reporter computing system 602. The memory 614 may further include computer program instructions and other information for implementing aspects of the present disclosure. For example, in one embodiment, the memory 614 may include a user interface module 616 that generates user interfaces (and/or instructions therefor) for presentation on the display 626, e.g., via a navigation interface such as a browser or application installed on the digital reporter computing system 602.

In some embodiments, the memory 614 may include a transcript generation component 620 and media playback component 622, which may be executed by the processing unit 606 to perform operations according to various embodiments described herein. The transcript generation component 620 may generally perform various operations for the real-time generating of a transcript from recorded spoken word audio data, which may include calling one or more network-accessible services or systems to perform related operations, as described above. The media playback component 622 may generally perform operations associated with navigating a generated transcript and playing audio or video content corresponding to given transcript content (such as playing recorded spoken word audio data starting at a point selected by a user of the digital reporter computing system with reference to displayed text data of a generated transcript).

The components or modules 620 and/or 622 may access the transcript/media data store 630 and/or speech model data store 632 in order to retrieve data described above and/or store data. The data stores 630 and 632 may be part of the digital reporter computing system 602, remote from the digital reporter computing system 602, and/or may be network-based services. The transcript/media data store 630 may store generated text transcripts along with corresponding audio (and optionally video) data, along with timestamp or other information that maps or links points in the transcript text to corresponding points in the audio. The transcript/media data store 630 may additionally store various metadata associated with a transcript, such as data regarding the event or proceeding associated with the transcript. The speech model data store 632 may store various speech models (or information identifying remotely stored speech models) that can be used to generate speech-to-text results for speakers having various speech traits and/or accents. The data store 632 may also store data associating certain speakers (e.g., a specific person) to a given speech model that is best suited for interpreting words spoken by the given speaker. Data store 630 may additionally store video captured in synchronization with audio and subsequently processed to provide an audio-visual presentation of recorded testimony with synchronized streaming text nearly immediately (e.g., within minutes, in some embodiments) after a proceeding.

In some embodiments, the network interface 608 may provide connectivity to one or more networks or computing systems, and the processing unit 606 may receive information and instructions from other computing systems or services via one or more networks. In the example illustrated in FIG. 6, the network interface 608 may be in communication with a reporting backend system 601 via the network 636, such as the Internet. In particular, the digital reporter computing system 602 may establish a communication link 642 with a network 636 (e.g., using known protocols), such as a VPN, in order to send communications to the reporting backend system 601 over the network 636. Similarly, the reporting backend system 601 may send communications to the digital reporter computing system 602 over the network 636 via a wired or wireless communication link. In some embodiments, the reporting backend system 601 may be used by the digital reporter computing system 602 to request various support services (such as access to network-accessible transcription services, speech-to-text services and/or other remote systems or services), as discussed above.

Those skilled in the art will recognize that the computing systems 601 and 602 may be any of a number of computing systems including, but not limited to, a laptop, a personal computer, a personal digital assistant (PDA), a hybrid PDA/mobile phone, a mobile phone, a smartphone, an electronic book reader, a digital media player, a tablet computer, a kiosk, an augmented reality device, another wireless device, a set-top or other television box, one or more servers, and the like. The reporting backend system 601 may include similar hardware to that illustrated as being included in digital reporter computing system 602, such as a processing unit, network interface, memory, operating system, etc. It will also be appreciated that depending on device capabilities, network speeds and other factors in a given environment and embodiment, operations described as performed by the digital reporter computing system (e.g., by the components 620 and 622) may instead be performed by the reporting backend system 601 and the results sent to the digital reporter computing system 602 for display, playback and/or storage, as appropriate. Similarly, in other embodiments, the digital reporter computing system may be capable of generating transcripts and playing back associated audio data without accessing any external systems or services (e.g., without necessarily sending or receiving data to any remotely located system, server or service over a network).

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:

a plurality of microphones;

audio mixer hardware configured to process a plurality of audio channels, wherein each of the plurality of microphones corresponds to a different channel of the plurality of audio channels; and a computing system in communication with the audio mixer hardware and comprising memory and a processor, the computing system configured with processor-executable instructions to perform operations comprising:

receiving speaker identification information for each of the plurality of audio channels, wherein the speaker identification information for each individual audio channel identifies a person assigned to the individual audio channel and vocal characteristic information of the person, wherein the person assigned to the individual audio channel is physically located closer to a microphone assigned to the individual audio channel than to any other microphone of the plurality of microphones;

selecting a speech model to be used with respect to audio data for each of two or more of the plurality of audio channels, wherein a first speech model selected for a first audio channel is based at least in part on vocal characteristic information of a first person assigned to the first audio channel;

receiving at least a portion of multi-channel streaming audio from the audio mixer hardware, wherein the multi-channel streaming audio comprises audio signals captured from each of the plurality of microphones on a different channel of the plurality of audio channels;

applying one or more filters to each channel of the multi-channel streaming audio to generate a plurality of filtered audio channels, wherein each of the filtered audio channels includes speech utterances spoken by a different person assigned to the individual corresponding audio channel, wherein the one or more filters include at least one of a bandpass filter or a noise reduction filter;

providing audio data from each of the filtered audio channels to a speech-to-text service configured to return text determined by applying automatic speech recognition to provided audio data, such that automatic speech recognition is applied by the speech-to-text service to each of the plurality of filtered audio channels in parallel, wherein the speech-to-text service is provided with a request that the first speech model be used for audio data from a first filtered audio channel corresponding to the first audio channel;

receiving, from the speech-to-text service, text results for audio data of each of the filtered audio channels, wherein text results for each of the filtered audio channels represent words spoken by a different speaker;

identifying a redundant word among text results of two or more of the filtered audio channels, wherein the redundant word comprises a word appearing in the text results of each of the two or more channels at matching timestamps;

determining a correct channel for the redundant word based on a comparison of, at points corresponding to the matching timestamps, (a) a first power measure of a first filtered audio channel and (b) a second power measure of a second filtered audio channel;

removing the redundant word from each of the two or more of the filtered audio channels other than the correct channel; and generating a real-time transcript of at least a portion of multi-speaker conversation based on the text results, wherein the real-time transcript is generated while the multi-channel streaming audio continues to be received from the audio mixer hardware, wherein the real-time transcript includes text assembled from text results of at least two different filtered audio channels in an order based on timestamp information, and wherein the transcript identifies the speaker of each word in the portion of the multi-speaker conversation based on speaker identification information received for a respective audio channel from which the word was identified.

2. The system of claim 1, wherein the operations further comprise:

presenting a portion of the real-time transcript for display within a user interface;

receiving, based on user interaction with the user interface, a request to play back captured audio corresponding to a selected position within the portion of the real-time transcript; and audibly presenting the captured audio beginning at the selected position.

3. The system of claim 1, wherein the captured audio played back was captured from an audio channel corresponding to a speaker designated in the transcript as speaking words appearing at the selected position within the portion of the real-time transcript.

4. The system of claim 1, wherein the first speech model is selected for the first audio channel based at least in part on at least one of an accent, tonality or gender of the first person.

5. The system of claim 1, wherein the first power measure of the first filtered audio channel represents a volume of audio captured at a specific point in the first filtered audio channel.

6. The system of claim 1, wherein providing the audio data to the speech-to-text service comprises securely sending the audio data to one or more remotely located systems, wherein securely sending the audio data comprises use of at least one of a virtual private network or a secure cryptographic protocol.

7. The system of claim 1, wherein the speech-to-text service is implemented by the computing system, such that the audio data is provided to the speech-to-text service without communicating with any network-accessible service external to the computing system.

8. A computer-implemented method comprising:

as implemented by one or more computing devices configured with specific executable instructions, receiving speaker identification information for each of a plurality of audio channels, wherein the speaker identification information for each individual audio channel identifies a person assigned to the individual audio channel, wherein each of the plurality of audio channels are associated with a different microphone of a plurality of microphones;

receiving multi-channel streaming audio on the plurality of audio channels, wherein the multi-channel streaming audio comprises audio signals captured from each of the plurality of microphones on a different channel of the plurality of audio channels;

applying one or more filters to each channel of the multi-channel streaming audio to generate a plurality of filtered audio channels, such that each of the filtered audio channels includes speech utterances spoken by a different person assigned to the individual corresponding audio channel;

applying automatic speech recognition to audio from each of the filtered audio channels in parallel to obtain text results for each of the filtered audio channels, wherein the text results for each of the filtered audio channels represent words spoken by a different speaker;

identifying a redundant word among text results of two or more of the filtered audio channels, wherein the redundant word comprises a word appearing in the text results of each of the two or more channels at matching timestamps;

determining a correct channel for the redundant word based on a comparison of, at points corresponding to the matching timestamps, (a) a first power measure of a first filtered audio channel and (b) a second power measure of a second filtered audio channel; and removing the redundant word from each of the two or more of the filtered audio channels other than the correct channel; and generating a transcript of at least a portion of multi-speaker conversation based on the text results, wherein the transcript includes text assembled from text results of at least two different filtered audio channels in an order based on timestamp information, and wherein the transcript identifies the speaker of each word in the portion of the multi-speaker conversation based on speaker identification information received for a respective audio channel from which the word was identified.

9. The computer-implemented method of claim 8, further comprising assembling an audio file that interleaves audio from different filtered audio channels according to which filtered audio channel corresponds to an active speaker at a given point.

10. The computer-implemented method of claim 8, wherein the multi-channel streaming audio is captured during a legal proceeding, and wherein the transcript is generated in real time during the legal proceeding.

11. The computer-implemented method of claim 10, further comprising automatically formatting text of the transcript using a template associated with a proceeding type of the legal proceeding.

12. The computer-implemented method of claim 8, further comprising causing display of at least a portion of the transcript that includes one or more words visually highlighted to indicate a relative confidence level associated with automatic speech recognition of the one or more words.

13. The computer-implemented method of claim 8, wherein generating the plurality of filtered audio channels comprises applying at least one of beamforming, adaptive weighting or echo cancellation to each of the plurality of audio channels.

14. A non-transitory computer-readable medium having stored thereon executable instructions that direct a computer system to perform operations comprising:

receiving speaker identification information for each of a plurality of audio channels, wherein the speaker identification information for each individual audio channel identifies a person assigned to the individual audio channel, wherein each of the plurality of audio channels are associated with a different microphone of a plurality of microphones;

receiving multi-channel streaming audio on the plurality of audio channels, wherein the multi-channel streaming audio comprises audio signals captured from each of the plurality of microphones on a different channel of the plurality of audio channels;

applying one or more filters to each channel of the multi-channel streaming audio to generate a plurality of filtered audio channels, such that each of the filtered audio channels includes speech utterances spoken by a different person assigned to the individual corresponding audio channel;

applying automatic speech recognition to audio from each of the filtered audio channels in parallel to obtain text results for each of the filtered audio channels, wherein the text results for each of the filtered audio channels represent words spoken by a different speaker;

identifying a redundant word among text results of two or more of the filtered audio channels, wherein the redundant word comprises a word appearing in the text results of each of the two or more channels at matching timestamps;

determining a correct channel for the redundant word based on a comparison of, at points corresponding to the matching timestamps, (a) a first power measure of a first filtered audio channel and (b) a second power measure of a second filtered audio channel; and removing the redundant word from each of the two or more of the filtered audio channels other than the correct channel; and generating a transcript of at least a portion of multi-speaker conversation based on the text results, wherein the transcript includes text assembled from text results of at least two different filtered audio channels in an order based on timestamp information, and wherein the transcript identifies the speaker of each word in the portion of the multi-speaker conversation based on speaker identification information received for a respective audio channel from which the word was identified.

15. The non-transitory computer-readable medium of claim 14, the operations further comprising assembling an audio file that interleaves audio from different filtered audio channels according to which filtered audio channel corresponds to an active speaker at a given point.

16. The non-transitory computer-readable medium of claim 14, wherein the multi-channel streaming audio is captured during an event, wherein the transcript is generated in real time during the event, and wherein the event comprises one of a deposition, a television broadcast, or a performance.

17. The non-transitory computer-readable medium of 14, the operations further comprising causing display of at least a portion of the transcript that includes one or more words visually highlighted to indicate a relative confidence level associated with automatic speech recognition of the one or more words.

18. The non-transitory computer-readable medium of claim 14, the operations further comprising generating a synchronized audiovisual presentation that presents portions of the transcript in synchronization with corresponding portions of video, wherein the synchronized audiovisual presentation is generated based at least in part on timestamps associated with the video that correspond to a clock that was also used in timestamping corresponding audio captured from the plurality of microphones.

\* \* \* \* \*